United States Patent [19]

Honomichl, Sr.

[11] 4,076,138

[45] Feb. 28, 1978

[54] ROUND BALE LOADER AND CARRIER

[76] Inventor: Ben K. Honomichl, Sr., Box 68, Jefferson, S. Dak. 57038

[21] Appl. No.: 647,125

[22] Filed: Jan. 7, 1976

[51] Int. Cl.² ............................................. B60P 1/36
[52] U.S. Cl. .................................... 214/518; 214/80
[58] Field of Search ................ 214/518, 80, 85, 85.1, 214/83.36, 6 B, 77 R, 77 P, 731; 296/57 A

[56] References Cited

U.S. PATENT DOCUMENTS

| | | | |
|---|---|---|---|
| Re. 25,750 | 3/1965 | Adams et al. | 214/6 B X |
| 3,184,088 | 5/1965 | Berge | 214/731 X |
| 3,510,013 | 5/1970 | Best | 214/6 B |
| 3,817,567 | 6/1974 | Lull | 214/731 X |
| 3,924,765 | 12/1975 | Hostetler | 214/518 |
| 3,942,666 | 3/1976 | Pfremmer | 214/518 |

FOREIGN PATENT DOCUMENTS 645,237  10/1950  United Kingdom ............. 296/57 A Primary Examiner—Albert J. Makay

[57] ABSTRACT

A carrier for material formed into cylindrical bales having a lifting and loading mechanism on the side and an unloading device adapted to roll the bale out of the path taken by the carrier.

4 Claims, 7 Drawing Figures

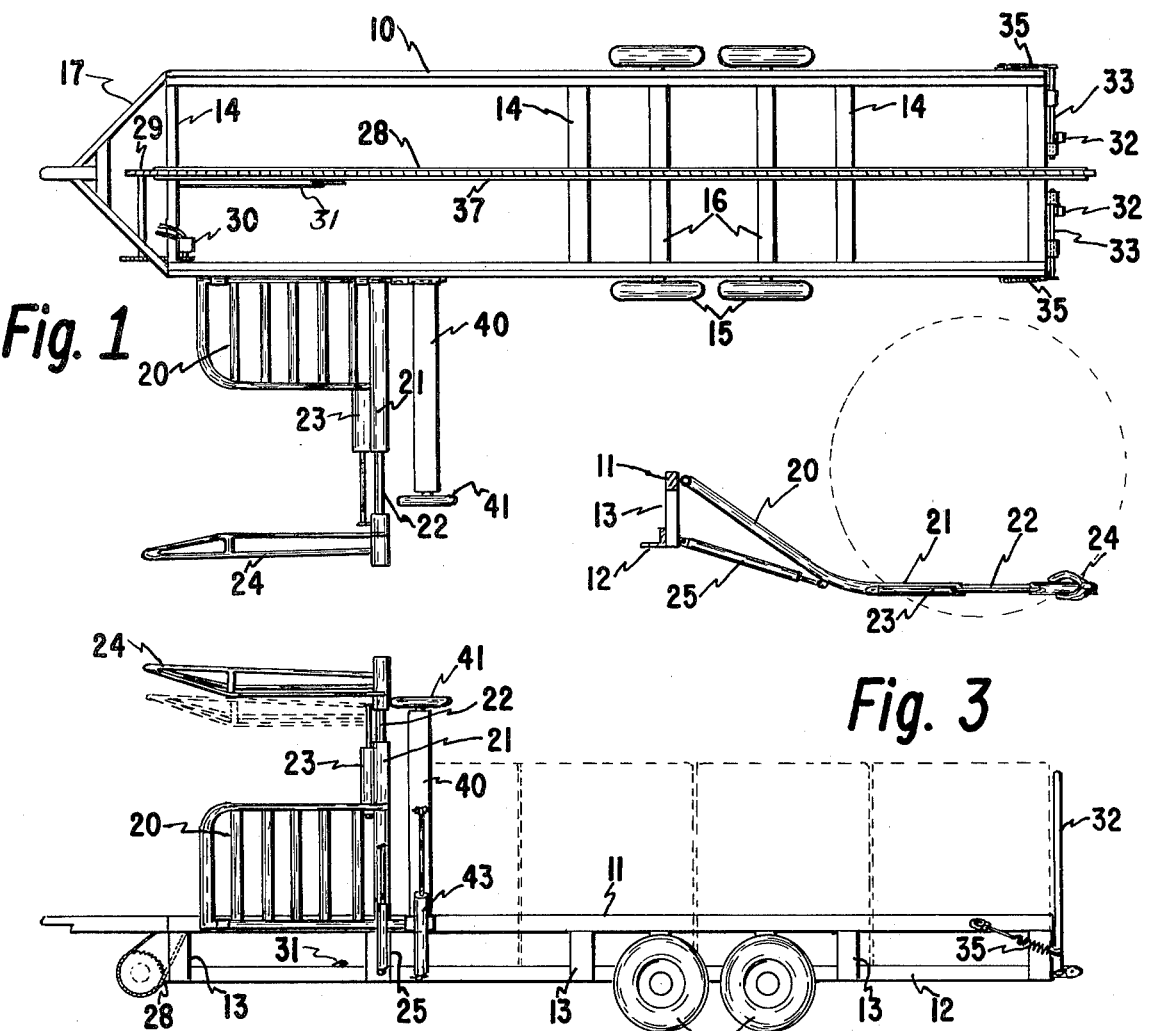

U.S. Patent  Feb. 28, 1978  Sheet 2 of 2  4,076,138

ROUND BALE LOADER AND CARRIER

BACKGROUND AND SUMMARY OF THE INVENTION

This invention pertains to farm implements adapted to carry baled forage material and particularly the currently-used cylindrical bales. The invention is concerned with the means for loading and unloading the bales by powered self-contained means.

In previous years, forage materials have been baled into bales of rectangular shapes. These bales were small enough so that they could be loaded, stacked and unloaded by a single person. Certain lifting devices and elevators were designed for handling these bales, but no other particular bale handling machinery was necessary.

At the present time, machinery has been designed and is being used to bale hay, straw and other forage material into much larger cylindrical bales. These bales weigh much more than an individual can lift, and therefore handling machinery is necessary.

Most present day handling machinery is designed to lift a single bale onto a wagon or other carrier, or to carry that single bale on a tractor in a manner similar to a fork lift truck. Because these bales are often rolled in large fields at some distance from the place they are to be stored and used, such handling of single bales is slow and cumbersome.

By my invention I provide a carrier designed to carry several bales from one point to another as well as to load the bale and unload it by self-contained power operated means.

FIGURES

Figure 5:
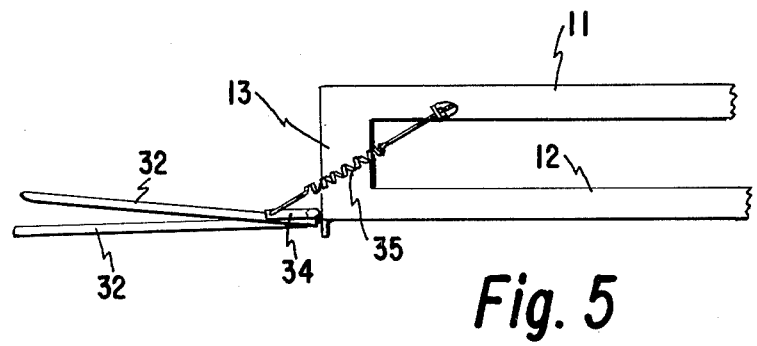
Figure 6:
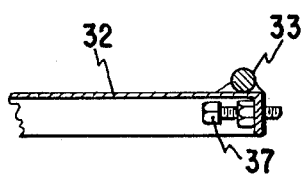
Figure 7:
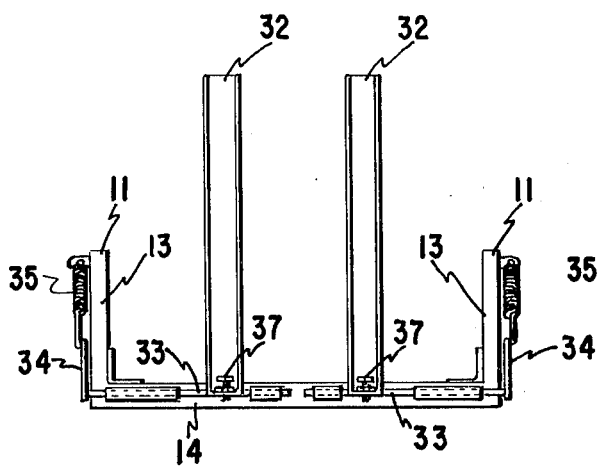

FIG. 1 is a top plan view of my device empty and with the loader and support bar in the down position, FIG. 2 is a side elevational view of the device with the loading mechanism and support bar raised, FIG. 3 is a detailed view of the loading mechanism, FIG. 4 is a detailed pictorial view to an enlarged scale of a portion of the unloading device, FIG. 5 is an elevational view of the rear end of the device showing the mechanism which causes the bale to roll off the device, FIG. 6 is a detailed view to an enlarged scale of one of the roll-off arms, and FIG. 7 is an end elevational view of the carrier showing the roll-off arms in the raised position.

DESCRIPTION

Briefly my invention comprises a wheeled bale carrier with a lifting means on one side having two arms adapted to slide under the bale and then to lift and roll the bale onto the carrier. Transport means on the carrier position the bale and, when desired, discharge the bale onto arm means arranged to cause the bale to roll off the device in a location displaced from the path of the carrier.

More specifically and referring to the figures, my device comprises principally a framework 10 having upper side rails 11 and lower frame members 12 held apart by vertical posts 13. The upper side rails 11 are preferably formed of tubing — either rectangular or round — so that the bales will readily slide along the rail. Cross rails 14 between the lower members 12 are spaced at intervals along the frame. The entire framework is carried by wheels 15 on axles 16 in sufficient number to provide proper support for the load to be carried. A tongue 17 is provided at the front end of the framework so that the device may be connected to a farm tractor or the like to be moved. The loading mechanism comprises principally a platform device pivoted to one side of the framework 10. Specifically, an inner platform 20 is pivotally attached to an upper member 11 near the tongue end or front end of the framework. This platform is also formed of pieces having rounded edges so that there will be no tearing into the bale, but that the platform will slide past the baled material.

At its rear edge, the platform 20 carries an arm 21 into which is telescopically fitted a carrier arm 22. This telescoping arrangement must be such that the one arm cannot rotate relative to the other, but that the arm can move longitudinally relative to the other. Power means in the form of an hydraulic cylinder 23 or the like is arranged to power the sliding movement between the two arms.

The carrier arm 22 carries an outer platform member 24. This member also has smooth rounded edges and corners so as to be readily slidable under the baled material. Thus, the entire loading device, may be driven up to a bale and then, with the lifting mechanism lowered it can be moved axially of the bale to embrace it between the inner platform 20 and the outer member 24. As the bale is embraced between the inner platform 20 and platform member 24, the cylinder 23 may be actuated to draw the member 24 towards the platform 20. This will have the effect of partially rotating the bale to line it up if it is misaligned, or of toppling it over on its side if it happens to be standing on end. Thus, the bale will be properly disposed so that subsequent raising will allow it to roll onto the adjacent framework as described hereafter.

Power means composed of another hydraulic cylinder 25 or similar means is engaged between a lower frame member 12 and the inner platform 20 to provide for pivotal lifting of the entire mechanism from the lower position shown in FIG. 1 to the raised position shown in FIG. 2. As the device is raised, a bale carried by the mechanism will simply roll off the platform and onto the framework.

Bales loaded onto the framework by the loading mechanism may have to be moved rearwardly of the frame to allow other bales to be loaded or to discharge the bales. Means to accomplish this moving is provided in the form of an endless chain 27 disposed in a track 28 running down the longitudinal centerline of the frame. The chain carries hooks or pins extending outwardly to engage the baled material so that the bale will slide on the rails 11 when the chain is moved. The chain is driven by a sprocket 29 which is in turn driven by a motor 30. This motor may be either an electric or an hydraulic motor.

Control means for the motor may include both manual control from the tractor pulling the mechanism and a semi-automatic control. The semi-automatic control is used when several bales are to be loaded. It may include a feeler lever 31 adapted to sense when a bale is loaded in the front position. When several bales are to be loaded, this mechanism may be actuated so that the bales will automatically be carried rearwardly until a space on the front large enough to receive an additional bale is opened. At that point, the lever 31 will sense the lack of a bale and will turn off the power to the motor 30. Similar automatic control means to override the semi-automatic controls at the front may be provided at the rear so that when a bale fills the rearmost spot, the motor will not run, or this type of override may be left to the manual control of the operator.

Discharge means adapted to roll the bale to the side of the path of the carrier is also provided. This means consists of a pair of arms 32 hinged to the rear cross rail 14 by means of an axle 33. The axle extends to the side of the framework where it is attached to a lever 34. Tension springs 34 are engaged between the levers 34 and the frame 10 to bias the arms 32 to their upright position as shown in FIG. 7.

When the bales are to be discharged, the motor 30 is started, and the semi-automatic controls are overridden so that the chain 27 carries the bales to the rear of the frame. As this happens, the rearmost bale presses the arms 32 downward against the force of the springs 35. The distance the arm 32 is depressed is controlled by adjustment means including screws 37 threaded into the arms 32 in position to engage the bar 14 to hold the arm 32 against further depression. In the preferred embodiment, the adjustment is such that one arm is depressed considerably lower than the other (See FIG. 5). This configuration, in effect, provides a sloping platform from which the bale will roll to the side of the carrier and out of the path of travel. This may be particularly effective where the bale is to be rolled from the carrier into a manger or feeding platform alongside the path of the carrier.

Stabilization means during the pickup process may also be provided. This includes a stabilizer arm 40 hinged to the side of the frame in the vicinity of the loading mechanism. A wheel 41 at the outer end of the stabilizer allows it to be lowered during the whole loading process. However, when the carrier is being used to carry bales from one position to another, the stabilizer is raised by power means including an hydraulic cylinder mechanism 43. This cylinder mechanism should be double acting so that the stabilizer is forcibly held in a lowered position where it will act to hold the framework of the carrier in a stable position while a bale is being raised by the loading mechanism.

Thus I provide a device capable of loading the large bales presently used, carrying them to another location, and unloading them to a location outside the line of travel of the carrier.

I claim:

1. Carrier means for carrying substantially cylindrical objects comprising a carrier frame mounted on wheels for transport, platform means pivotally connected to said frame near one end thereof, a carrier arm slidably mounted on said platform means for movement toward and away from said platform means, said carrier arm and said platform means each including means extending substantially parallel to said frame arranged to bracket said cylindrical object, power means connected between said carrier arm and said platform means adapted to slide said carrier arm relative to said platform means, and second power means connected between frame and said platform means to pivot the platform means relative to said frame whereby said cylindrical object may be raised and rolled onto said frame, and discharge means provided on said frame including a pair of arms hinged to said frame and located so that said cylindrical object will be moved onto them, said arms being supported from said frame in laterally spaced relation to each other, one arm being generally higher than the other so that said object will be caused to roll off to the side of said arms.

2. The device of claim 1 in which spring means are engaged between each of said arms and said frame to bias said arms to an upright position, said arms in a lower position being vertically displaced from each other to cause the rolling of said cylindrical object.

3. The device of claim 1 further including a transport means comprising a chain extending longitudinally of said frame and means on said chain engage said cylindrical objects for transport longitudinally of the frame.

4. The device of claim 1 in which adjustment means are connected with each of said arm means whereby the lower position of each arm may be individually adjusted.

* * * * *